United States Patent [19]

Boggy et al.

[11] Patent Number: 4,729,655

[45] Date of Patent: Mar. 8, 1988

[54] DEVICE FOR SHAPING THE ANGULAR RESPONSE OF A LIGHT METER OR THE ANGULAR EMISSION OF A LIGHT SOURCE

[75] Inventors: Richard D. Boggy, Milpitas; Eric G. Marason, Mountain View, both of Calif.

[73] Assignee: Chromadyne Corporation, Sunnyvale, Calif.

[21] Appl. No.: 924,023

[22] Filed: Oct. 28, 1986

[51] Int. Cl.$^4$ .................. G01J 1/00; G01B 11/26; H01J 5/16

[52] U.S. Cl. .................... 356/121; 356/152; 250/227; 350/96.1

[58] Field of Search ............. 356/121, 138, 141, 152, 356/216, 225; 250/227; 350/96.24, 96.23, 96.25, 96.10

[56] References Cited

U.S. PATENT DOCUMENTS

| | | | |
|---|---|---|---|
| 4,310,246 | 1/1982 | Blazek | 356/236 |
| 4,391,521 | 7/1983 | Imai et al. | 356/225 |
| 4,420,252 | 12/1983 | Nakauchi | 356/225 |
| 4,511,250 | 4/1985 | Olsen | 356/225 |
| 4,571,076 | 2/1986 | Johnson | 356/152 |
| 4,678,328 | 7/1987 | Craig et al. | 356/152 X |
| 4,690,556 | 9/1987 | Walker | 356/152 |

Primary Examiner—Eugene R. LaRoche
Assistant Examiner—David Mis

[57] ABSTRACT

A fiber optic (12) and correcting element (18) combination with the property of providing shaped angular response when used in conjunction with a radiometer, and of providing shaped angular emission when used in conjunction with a light source.

18 Claims, 5 Drawing Figures

DEVICE FOR SHAPING THE ANGULAR RESPONSE OF A LIGHT METER OR THE ANGULAR EMISSION OF A LIGHT SOURCE

BACKGROUND OF THE INVENTION

This invention relates generally to photometers, radiometers, and light sources, and specifically to (1) a radiometer whose response varies with the angle of incident radiation according to virtually any desired function of the incident angle and (2) a light source whose emission intensity varies according to virtually any desired function of the emission angle.

In a variety of scientific and technological endeavors, an angle-dependent measure of the optical intensity at a point in space is desirable. Most familiar of possible angular responses is the Lambertian (or cosine) response for which the response of the radiometer is proportional to the cosine of the angle of incidence (with normal equal to zero degrees). The ultraviolet exposure response of photoresist during semiconductor device fabrication, for example, is Lambertian. A radiometer with Lambertian angular response and a spectral response appropriate to the particular photoresist would be a valuable tool for the calculation of photoresist exposure times. Another angular response of value is one that responds equally in all angles of incidence. This would be of use in the measurement of laser radiation where the alignment of radiometer to laser beam is impractical (as when the beam is invisible) or when measuring intensity from a source of unknown direction.

While many currently available radiometers are Lambertian in response, none remains so after reducing the numerical aperture by the addition of optical filters, apertures, and/or a detecting surface remote from the light-gathering area. These numerical aperture decreasing techniques result in a radiometer that is clearly non-Lambertian, if only by virtue of its lack of response to light rays outside of the reduced acceptance angle.

Heretofore, angular response correcting devices for light measurement instruments were large and relatively expensive, such as integrating spheres (e.g., U.S. Pat. No. 4,310,246 to Blazek, Jan. 12, 1982); the multiple detector device of U.S. Pat. No. 4,420,252 to Nakauchi, Dec. 13, 1983; or the complex array of spheres of U.S. Pat. No. 4,511,250 to Olsen, Apr. 16, 1985. Some are suited only for shaping the angular response of one particular instrument to only one corrected response (e.g., U.S. Pat. No. 4,391,521 to Imai et al., July 5, 1983).

None of the prior art patents provides the versatility of the present invention in its ability to correct nearly any angular response to the shape of nearly any other angular response. Furthermore, the present invention is very inexpensive to fabricate, can acquire light in the tiniest of spaces, and is well-suited to the measurement of ultra-high intensity sources, such as those used in wafer step-and-repeat machines in the semiconductor photolithography field. This high intensity suitability arises from the relative insensitivity of the fiber optic element to the heat generated by high-intensity light and the capability for placing the temperature-perturbable photodetective element at the far end of the fiber optic, safely away from heat.

Finally, the present invention allows for the insertion of any number of spectral filters to shape the spectral response of the radiometer without sacrificing angular response; the correcting element is simply designed to reshape the angular response to accommodate the filters.

The essential elements of the present invention—the fiber optic and correcting element—can be juxtaposed to provide another feature, the shaping of the angular emission of a light source. The resultant light source of shaped angular emission would be desirable for navigational aids and beacons, traffic signals with selective lane control, guidance systems, displays, or in reshaping the beam intensity profile of a collimated source as illustrated in FIG. 5 and described later.

DRAWING FIGURES

Figure 1:
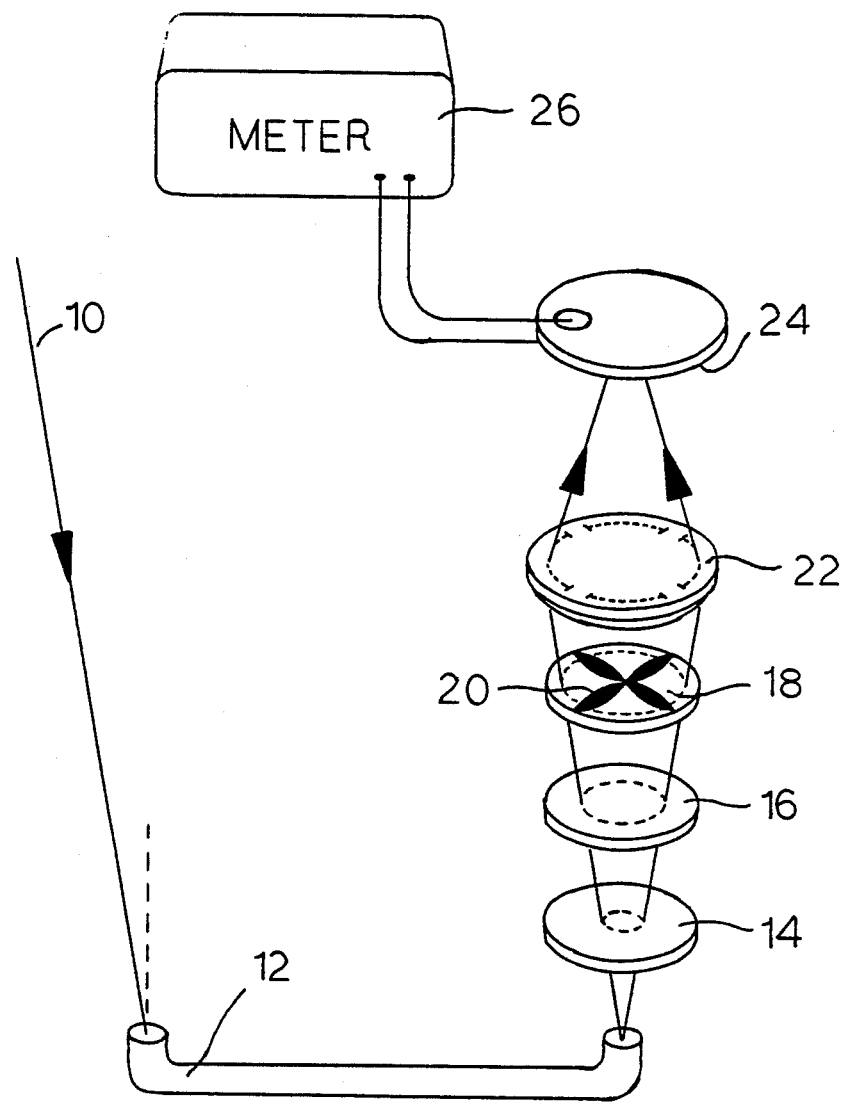
FIG. 1 is an exploded view of the invention in the preferred embodiment.

DRAWING REFERENCE NUMERALS 10 light ray bundle
12 fiber optic
14 filter
16 filter
18 correcting element
20 light blocking region of 18
22 lens
24 photodetector
26 meter
30 incident angle
32 light ray bundle
34 fiber optic
36 cone half angle
38 light cone
40 correcting element
42 light blocking region of 40
44 light transmitting region of 40
46 transmitted circular segment of light
48 photodetector
50 meter
60 correcting element
62 light blocking region of 60
64a,b illuminated circles of light
66 correcting element
68a,b,c,d light blocking lobes of 66
70 correcting element
72 correcting element
80 uncorrected angular response
82 corrected angular response
84 correction limit angle
90 input beam cross-section
92 intensity profile of 90
94 focussing lens
96 correcting element
97 light blocking region of 96
98 fiber optic
100 collimating lens 102 output beam cross-section
104 intensity profile of 102

LIGHT MEASUREMENT DEVICE—DESCRIPTION

FIG. 1 shows a light measurement device according to the preferred embodiment of the invention. The device comprises a fiber optic 12 which made of glass, plastic, or other optically transmissive materials having a refractive index great enough to allow total internal reflection of light within the individual fibers. Fiber optic 12 can be a single optical fiber or a bundle of several smaller fibers, the small fibers allowing for a tighter bend radius without optical loss, thus permitting measurement in confined spaces.

Filters 14 and 16 can be of the absorbing or interference type and are also made of glass, plastic, or other transmissive material. These filters are typically cemented together with optical cement and mounted to the end of fiber optic 12 with the same cement. In addition to their optical filtering function, filters 14 and 16 serve as spacers to allow sufficient divergence of the light before it reaches correcting element 18.

Correcting element 18 is typically cemented to filters 14 and 16. It consists of a thin sheet of optically transmissive material, such as glass or plastic, having light blocking regions 20 that are absorptive or reflective. The resultant angular response of the invention depends upon the size and shape of these light blocking regions as described later.

Lens 22 mounts to the correcting element 18 and is in turn surmounted by the photodetector 24. Photodetector 24 is typically a photodiode when size constraints exist. The electrodes of the photodetector are electrically connected to a meter 26 that is capable of providing a numerical output, either digital or analog, of the light intensity reaching photodetector 24.

LIGHT MEASUREMENT DEVICE—THEORY

The light measurement device of FIG. 1 will provide the user with virtually any angular response desired if the proper position and shape of the light blocking regions 20 of correcting element 18 are employed.

The optical fiber and correcting element combination is the key to shaping the angular response of the light meter, and relies on an interactive property of optical fibers.

Consider an optical fiber whose end faces are flat, polished, and perpendicular to the cylindrical axis of the fiber. A light beam of finite width entering the fiber at an angle to the axis that is greater than zero but less than the maximum acceptance angle of the particular fiber will emerge from the other fiber end as a uniform cone of light. Projecting this light cone onto a flat surface reveals a sharp ring of light. Changing the angle at which the light beam enters the fiber causes the light cone angle to change and consequently changes the diameter of its projected light ring. The emergent cone half-angle is equal to the entrance angle of the incoming light beam. The diameter of the projected circle depends upon the distance, d, between the exit tip of the fiber and the flat projection surface, and is equal to $2d.\tan A$, where A is the entrance angle of the incoming light beam.

By blocking a portion of the light cone before it reaches the flat surface, the percentage of the total light in the projected light ring that does reach the flat surface can be controlled. For example, blocking half of the light ring for a light beam entering the fiber at a 45° angle reduces the total light reaching the flat surface by 50% at 45°. Another light beam entering the fiber at a different angle, say 30°, produces a light ring of smaller diameter which can be blocked by a different amount if desired.

In the present invention, the light blocking regions of the correcting element control the amount of light from each angle's light ring that reaches the photodetector. The photodetector can be likened to the flat screen in the example above. This shaping of the amount of light reaching the photodetector for each angle is equivalent to shaping the angular response of the system and, because the light blocking regions of the correcting element can be continuous or discrete, virtually any angular function of response can be achieved. Notice that angular response shaping using this method is always at the expense of overall intensity.

LIGHT MEASUREMENT DEVICE—OPERATION

Figure 2:
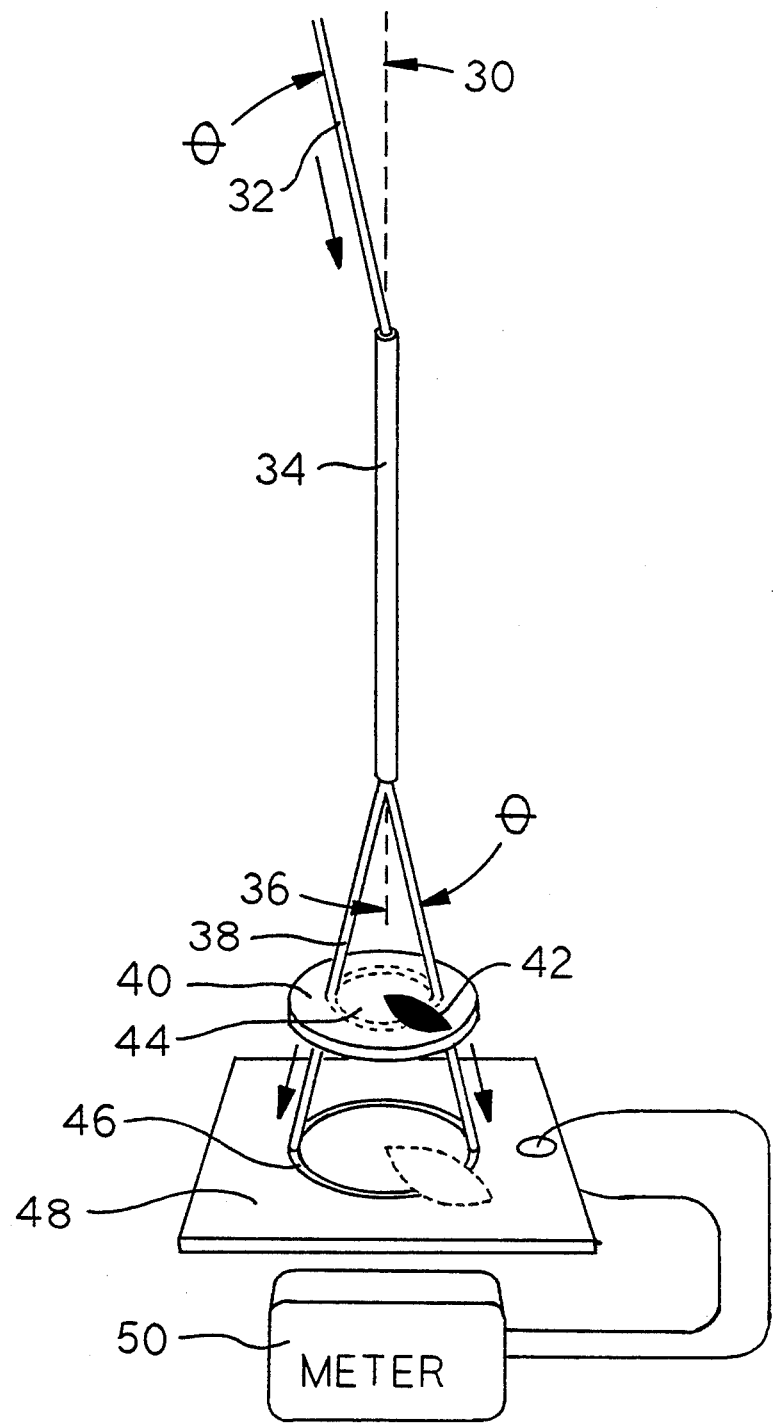
FIG. 2 is an exploded view of a second embodiment showing a typical light ray bundle as it passes through the fiber optic, fans into a cone of light, passes throught the correcting element, and impinges onto the photodetector.

FIG. 2 is an exploded view of a second embodiment of the present invention. Light ray bundle 32 enters the fiber optic 34 at incident angle 30 and emerges at the other end as light cone 38 with cone half-angle 36, which is equal to incident angle 30. Light cone 38 passes through correcting element 40, is partially blocked by light blocking region 42, and projects itself onto photodetector 48 as a transmitted circular segment of light. The electrical signal produced by the light impinging onto the phototdetector is converted to a numerical output by meter 50.

The preferred embodiment in FIG. 1 has a similar operation. Light ray bundle 10 enters fiber optic 12 and emerges as a cone which passes through filters 14 and 16, to correcting element 18 where it is blocked partially by light blocking regions 20. Lens 22 converges the transmitted light onto photodetector 24. The electrical signal produced by photodetector 24 is numerically displayed by meter 26.

Figure 3:
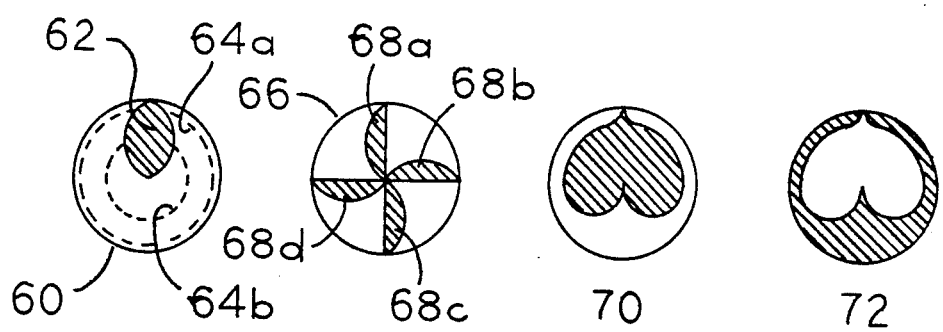
FIG. 3 illustrates several possible forms of the correcting element.
Figure 4:
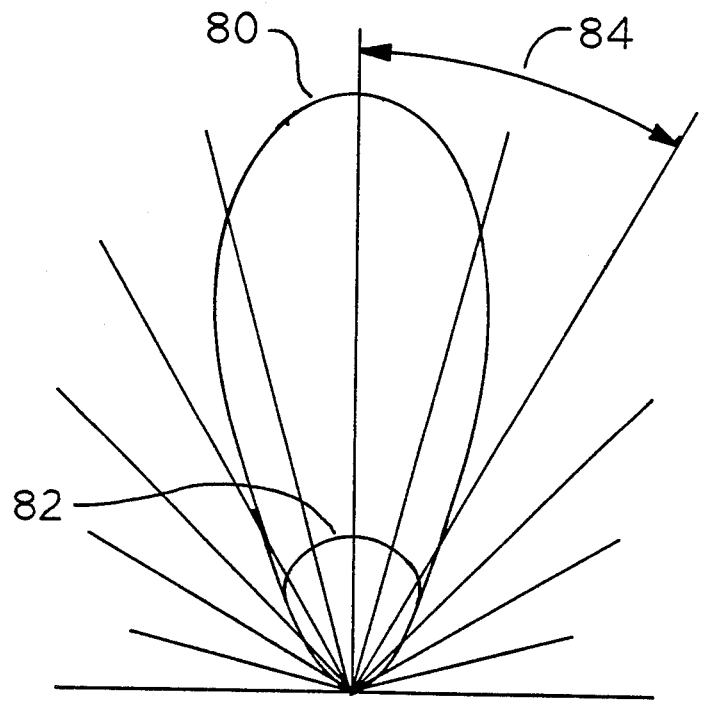
FIG. 4 is a graph in polar coordinates showing a typical uncorrected angular response and the corresponding corrected Lambertian response provided by the embodiment shown in FIG. 1.

FIG. 3 shows some typical forms of the correcting element, but is by no means a completes display of all possible forms. Correcting element 60 has a light blocking region 62 that blocks light from large incident angle beams, shown by light circle 64a, more than it blocks light from smaller incident angle beams, shown by light circle 64b. Correcting element 66 has light blocking regions in four lobes 68a,b,c,d. Splitting the blocking region into two or more lobes makes the correcting element less sensitive to axial misalignment. Correcting element 70 typefies a design that gives high response to large incident angle light, but low response to low incident angle light. Correcting element 72 typefies a design that gives low response to high incident angle light, but high response to low incident angle light.

LIGHT SOURCE OF SHAPED ANGULAR EMMISION—DESCRIPTION

Figure 5:
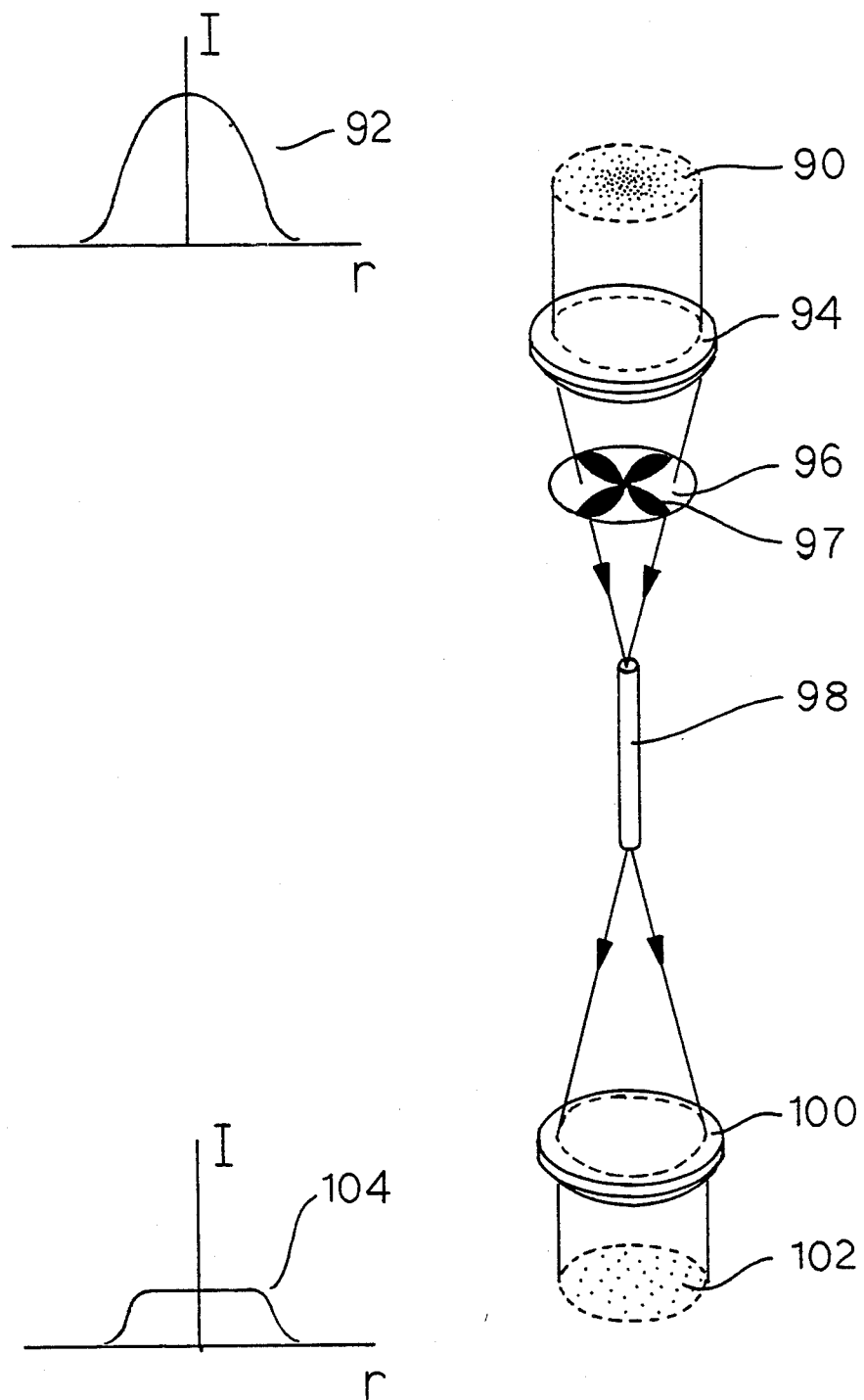
FIG. 5 illustrates the technique of modifying the beam intensity profile.

FIG. 5 shows a light source of shaped angular emission according to one embodiment of the invention. The device comprises a focussing lens 94 which is held close to correcting element 96. Fiber optic 98 is held at least several fiber diameters away from the correcting element 96, with its far end several fiber daimeters from collimating lens 100. The correcting element 96 is of the same material as correcting element 18 which has been previously described.

LIGHT SOURCE OF SHAPED ANGULAR EMISSION—THEORY

The light source of FIG. 5 will provide the user with virtually any angular response desired if the proper position and shape of the light blocking regions of the correcting element are employed. The theory is the same as that for the light measurement device described earlier wherein concentric light cones are modified to the desired degree by the correcting element according to their respective cone angles. The only difference is that, with the light source of shaped angular emission, the correcting element is placed in the light path before the light enters the optical fiber rather than after the light has exited the fiber.

LIGHT SOURCE OF SHAPED ANGULAR EMISSION—OPERATION

FIG. 5 is an exploded view of the present invention with lenses 94 and 100 chosenfor the specific application of modifying the intensity profile of a beam of light, such as a laser beam. Other possible embodiments could omit either or both of these lenses.

Beam 90 is a collimated beam of light with an intensity profile as shown in graph 92 where I represents the beam intensity and r is the radial distance from the center line or axis of beam propogation. The beam 90 is most intense at its center and fades in intensity rather smoothly with distance from the center, a characteristic of Gaussian beams, for example. Passing through focussing lens 94, the light encounters the correcting element 96 with light blocking regions 97 which block some of the light. The transmitted portion of the light is focussed into optical fiber 98, emerges from the other end of 98, and is collimated by lens 100. The emergent beam is of uniform intensity across its area, as illustrated by graph 104 where, as before, I represents intensity and r is the radial distance from the center of the beam.

We Claim:

1. A light modifying device capable of shaping the angular response of a radiometer or shaping the angular emission pattern of a light source comprising
   (a) an optical fiber bundle, said fiber bundle having the property of spreading light ray bundles of different input angles into uniform output cones of light with cone angles equal to the respective input angles of said light ray bundles; and
   (b) a correcting element, said correcting element having light transmitting and light blocking regions such that said light blocking region block desired fractions of (1) said output cones of light in the case of the radiometer, or of (2) said light ray bundles of different input angles in the case of the light source.

2. A light modifying device as set forth in claim 1 wherein said fiber bundle is a single optical fiber.

3. A light modifying device as set forth in claim 1 wherein said fiber bundle has one or more bends.

4. A light modifying device as set forth in claim 1 wherein said light blocking regions of said correcting element are reflective or absorptive.

5. A light modifying device as set forth in claim 1 wherein said fiber bundle is encased in a protective housing.

6. A light modifying device as set forth in claim 1 wherein one or more optical filters are used to shape the spectral response of said radiometer or the spectral emission of said light source.

7. A light measurement device of shaped angular response comprising
   (a) an optical fiber bundle, said fiber bundle having the property of spreading light ray bundles of different input angles into uniform output cones of light with cone angles equal to the respective input angles of said light ray bundles;
   (b) a correcting element, said correcting element having light transmitting and light blocking regions such that said light blocking region block desired fractions of each of said output cones of light;
   (c) a photodetector to receive the light transmitted by said optical fiber bundle and said correcting element; and
   (d) a meter to provide a numerical output of the amount of light received by said photodetector.

8. A light measurement device as set forth in claim 7 wherein said fiber bundle is a single optical fiber.

9. A light measurement device as set forth in claim 7 wherein said fiber bundle has one or more bends.

10. A light measurement device as set forth in claim 7 wherein said light blocking regions of said correcting element are reflective or absorptive.

11. A light measurement device as set forth in claim 7 wherein said fiber bundle is encased in a protective housing.

12. A light measurement device as set forth in claim 7 wherein one or more optical filters are used to shape the spectral response of said light measurement device.

13. A light source of a shaped angular emission pattern comprising
    (a) an optical fiber bundle, said fiber bundle having the property of spreading light ray bundles of different input cone angles into uniform output cones of light of cone angles equal to the respective input cone angles of said light ray bundles;
    (b) a correcting element, said correcting element having light transmitting and light blocking regions such that said light blocking region block desired fractions of each of the input cones of light;
    (c) a light source focussed through said correcting element and onto the input face of said fiber bundle.

14. A light source of shaped angular emission as set forth in claim 13 wherein said fiber bundle is a single optical fiber.

15. A light source of shaped angular emission as set forth in claim 13 wherein said fiber bundle has one or more bends.

16. A light source of shaped angular emission as set forth in claim 13 wherein said light blocking regions of said correcting element are reflective or absorptive.

17. A light source of shaped angular emission as set forth in claim 13 wherein said fiber bundle is encased in a protective housing.

18. A light source of shaped angular emission as set forth in claim 13 wherein one or more optical filters are used to shape the spectral output of said light source.

* * * * *